US012626912B2

(12) United States Patent
Otaki et al.

(10) Patent No.: US 12,626,912 B2
(45) Date of Patent: May 12, 2026

(54) ACTIVE MATERIAL, ALL SOLID STATE BATTERY, AND METHODS FOR PRODUCING ACTIVE MATERIAL

(71) Applicant: TOYOTA JIDOSHA KABUSHIKI KAISHA, Toyota (JP)

(72) Inventors: Mitsutoshi Otaki, Susono (JP); Jun Yoshida, Mishima (JP); Tetsuya Waseda, Bunkyo-ku (JP); Masanori Harata, Kariya (JP); Tatsuya Eguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 17/520,897

(22) Filed: Nov. 8, 2021

(65) Prior Publication Data

US 2022/0149360 A1 May 12, 2022

(30) Foreign Application Priority Data

Nov. 11, 2020 (JP) ................................. 2020-188134

(51) Int. Cl.
*H01M 4/38* (2006.01)
*H01M 4/02* (2006.01)
(Continued)

(52) U.S. Cl.
CPC ......... *H01M 4/386* (2013.01); *H01M 4/0461* (2013.01); *H01M 10/0562* (2013.01);
(Continued)

(58) Field of Classification Search
CPC .... H01M 4/0461; H01M 4/134; H01M 4/386; H01M 4/1395; C01P 2002/82; Y02E 60/10
See application file for complete search history.

(56) References Cited

U.S. PATENT DOCUMENTS 8,968,929 B2 * 3/2015 Chan ................. H01M 10/0525
252/182.1
2012/0211695 A1 8/2012 Kanno et al.
(Continued)

FOREIGN PATENT DOCUMENTS

JP 2011-108635 A 6/2011
JP 2018-142431 A 9/2018
(Continued)

OTHER PUBLICATIONS

Tao, Y., Zeng, G., Xiao, C., Liu, Y., Qian, Y., & Feng, J. (2019). Porosity controlled synthesis of nanoporous silicon by chemical dealloying as anode for high energy lithium-ion batteries. Journal of colloid and interface science, 554, 674-681. (Year: 2019).*
(Continued)

*Primary Examiner* — Tiffany Legette
*Assistant Examiner* — Christine Disney
(74) *Attorney, Agent, or Firm* — Dinsmore & Shohl LLP

(57) ABSTRACT

A main object of the present disclosure is to provide an active material wherein the volume variation of an electrode layer during charge/discharge may be suppressed. The present disclosure achieves the object by providing an active material used for an all solid state battery, the active material comprising at least Si, and in infrared spectrum, when a maximum peak intensity in 900 cm$^{-1}$ or more and 950 cm$^{-1}$ or less is regarded as $I_1$, and a maximum peak intensity in 1000 cm$^{-1}$ or more and 1100 cm$^{-1}$ or less is regarded as $I_2$, the $I_1$ and the $I_2$ satisfy $0.55 \leq I_2/I_1 \leq 1.0$, and $0.01 \leq I_1$.

9 Claims, 3 Drawing Sheets

Silicon clathrate II type

Silicon clathrate I type

(51) Int. Cl.
| | |
|---|---|
| *H01M 4/04* | (2006.01) |
| *H01M 10/0562* | (2010.01) |
| *H01M 4/134* | (2010.01) |
| *H01M 4/1395* | (2010.01) |

(52) U.S. Cl.
CPC ...... *H01M 2004/027* (2013.01); *H01M 4/134* (2013.01); *H01M 4/1395* (2013.01)

(56) References Cited

U.S. PATENT DOCUMENTS

| | | | | |
|---|---|---|---|---|
| 2013/0280609 A1* | 10/2013 | Chan | ........................ | C01B 33/00 |
| | | | | 252/182.1 |
| 2015/0372292 A1 | 12/2015 | Yokoi et al. | | |
| 2015/0376016 A1* | 12/2015 | Krishna | ................ | C01B 33/021 |
| | | | | 252/62.3 T |
| 2019/0305368 A1* | 10/2019 | Mizutani | ............... | H01M 4/134 |
| 2020/0119352 A1 | 4/2020 | Kosaka et al. | | |
| 2020/0176768 A1 | 6/2020 | Kosaka et al. | | |
| 2021/0175498 A1* | 6/2021 | Feaver | ................. | H01M 4/386 |
| 2021/0305556 A1 | 9/2021 | Otaki et al. | | |
| 2021/0391576 A1 | 12/2021 | Otaki et al. | | |

FOREIGN PATENT DOCUMENTS

| | | |
|---|---|---|
| JP | 2019-119638 A | 7/2019 |
| JP | 2020064716 A | 4/2020 |
| JP | 2020087886 A | 6/2020 |
| JP | 2021-158003 A | 10/2021 |
| JP | 2021-158004 A | 10/2021 |
| KR | 10-2020-0042399 A | 4/2020 |
| WO | 2014/119238 A1 | 8/2014 |

OTHER PUBLICATIONS

Zhao, R., Bobev, S., Krishna, L., Yang, T., Weller, J. M., Jing, H., & Chan, C. K. (2017). Anodes for lithium-ion batteries based on type I silicon clathrate Ba8Al16Si30-role of processing on surface properties and electrochemical behavior. ACS applied materials & interfaces, 9(47), 41246-41257. (Year: 2017).*

\* cited by examiner

FIG. 1A
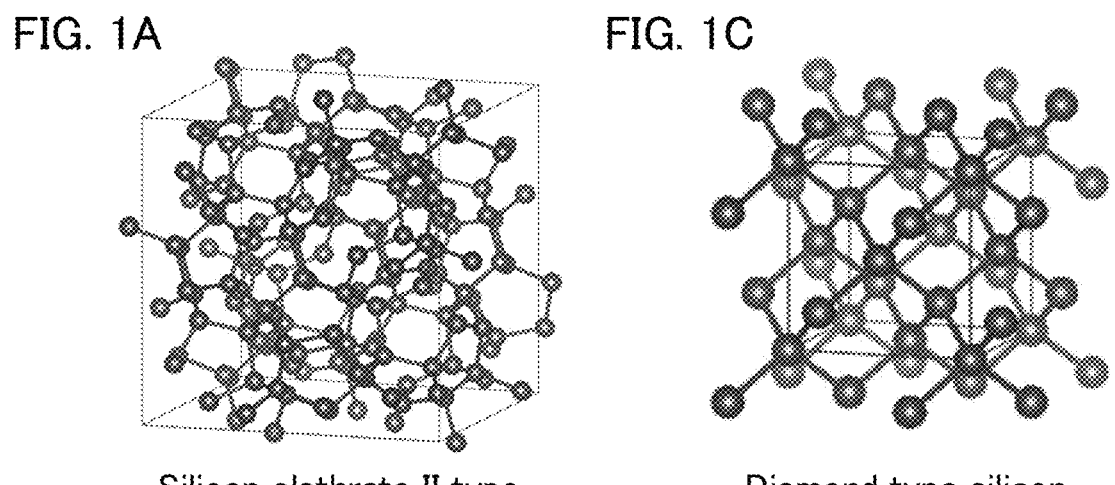
Silicon clathrate II type
FIG. 1C
Diamond type silicon
FIG. 1B
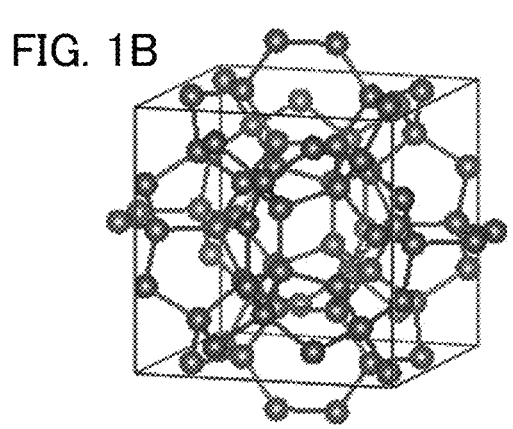
Silicon clathrate I type
FIG. 2
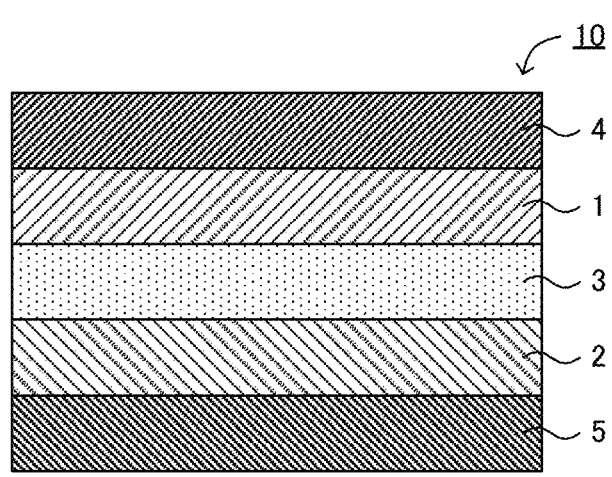

ACTIVE MATERIAL, ALL SOLID STATE BATTERY, AND METHODS FOR PRODUCING ACTIVE MATERIAL

CROSS-REFERENCE TO RELATED APPLICATIONS

This application is based upon and claims the benefit of priority of the prior Japanese Patent Application No. 2020-188134, filed on Nov. 11, 2020, the entire contents of which are incorporated herein by reference.

TECHNICAL FIELD

The present disclosure relates to an active material, an all solid state battery, and methods for producing an active material.

BACKGROUND ART

An all solid state battery is a battery including a solid electrolyte layer between a cathode layer and an anode layer, and has advantages in that it is easy to simplify a safety device as compared with a liquid battery including a liquid electrolyte containing flammable organic solvents. Also, as an active material to be used for the all solid state battery, a Si based active material has been known. For example, Patent Literature 1 discloses an anode for a sulfide all solid state battery comprising an anode active material layer including at least one kind of material selected from a group consisting of Si and a Si alloy, as an anode active material.

Also, Patent Literature 2 discloses a silicon oxide structure including a silicon oxide skeleton including Si and O in the atomic composition; and silicon based nanoparticles chemically bonded to the silicon oxide skeleton, as constituents. Further, Patent Literature 2 discloses that, in the spectrum measured by an infrared spectroscopy, the ratio $(I_1/I_2)$ of the intensity $(I_1)$ of peak 1 deriving from Si—H bond located in 820 $cm^{-1}$ or more and 920 $cm^{-1}$ or less and the intensity $(I_2)$ of peak 2 deriving from Si—O—Si bond located in 1000 $cm^{-1}$ or more and 1200 $cm^{-1}$ or less, is in a predetermined range.

Also, in Patent Literature 3 discloses $SiO_x$ (anode active material for a lithium ion secondary battery) wherein, in the spectrum measured by an infrared spectroscopic instrument, the ratio value $A_1/A_2$ of the intensity of peak $A_1$ deriving from a silanol group located in 3400 $cm^{-1}$ or more and 3800 $cm^{-1}$ or less and the intensity of peak $A_2$ deriving from a siloxane bond located in 1000 $cm^{-1}$ or more and 1200 $cm^{-1}$ or less, is 0.1 or less.

Also, Patent Literature 4 discloses an anode active material comprising a base particle composed of silicon oxide, and a coating layer that is composed of a conductive carbon material and coats at least a part of a surface of the base particle, wherein the intensity at 900 $cm^{-1}$ is 0.30 or more, when the maximum peak intensity in 600 $cm^{-1}$ to 1400 $cm^{-1}$ in infrared absorption spectrum obtained by infrared spectroscopic measurement is regarded as 1.

CITATION LIST

Patent Literatures

Patent Literature 1: Japanese Patent Application Laid-Open (JP-A) No. 2018-142431
Patent Literature 2: JP-A No. 2019-119638

Patent Literature 3: JP-A No. 2011-108635
Patent Literature 4: International Publication WO2014/119238

SUMMARY OF DISCLOSURE

Technical Problem

The theoretical capacity of Si is large, which is useful in high energy condensation of a battery. On the other hand, the volume variation of Si is large during charge/discharge. Therefore, the volume variation of an electrode layer using Si is large during charge/discharge. The present disclosure has been made in view of the above circumstances, and a main object of the present disclosure is to provide an active material wherein the volume variation of an electrode layer during charge/discharge may be suppressed.

Solution to Problem

The present disclosure provides an active material used for an all solid state battery, the active material comprising at least Si, and in infrared spectrum, when a maximum peak intensity in 900 $cm^{-1}$ or more and 950 $cm^{-1}$ or less is regarded as $I_1$, and a maximum peak intensity in 1000 $cm^{-1}$ or more and 1100 $cm^{-1}$ or less is regarded as $I_2$, the $I_1$ and the $I_2$ satisfy $0.55 \leq I_2/I_1 \leq 1.0$, and $0.01 \leq I_1$.

According to the present disclosure, since the value of $I_2/I_1$ is in a predetermined range, and further, since the value of $I_1$ is also in a predetermined range, an active material wherein the volume variation of an electrode layer during charge/discharge may be suppressed, may be obtained.

In the disclosure, the $I_1$ may satisfy $0.02 \leq I_1 \leq 0.08$.

Also, the present disclosure provides an active material used for an all solid state battery, the active material comprising at least Si, and in infrared spectrum, when a maximum peak intensity in 900 $cm^{-1}$ or more and 950 $cm^{-1}$ or less is regarded as $I_1$, and a maximum peak intensity in 1000 $cm^{-1}$ or more and 1100 $cm^{-1}$ or less is regarded as $I_2$, the $I_1$ and the $I_2$ satisfy $0.55 \leq I_2/I_1 23$ $1.0$, and $0.01 \leq I_2$.

According to the present disclosure, since the value of $I_2/I_1$ is in a predetermined range, and further, since the value of $I_2$ is also in a predetermined range, an active material wherein the volume variation of an electrode layer during charge/discharge may be suppressed, may be obtained.

In the disclosure, the $I_2$ may satisfy $0.02 \leq I_2 \leq 0.08$.

In the disclosure, the active material may include at least one of a silicon clathrate II type crystal phase, a silicon clathrate I type crystal phase, and a diamond type Si crystal phase.

In the disclosure, the active material may include a void inside a primary particle.

Also, the present disclosure provides an all solid state battery comprising a cathode layer, an anode layer, and a solid electrolyte layer formed between the cathode layer and the anode layer, and the anode layer includes the active material described above, and a solid electrolyte.

According to the present disclosure, an all solid state battery wherein the volume variation of an anode layer during charge/discharge may be suppressed, may be obtained by using the above described active material.

Also, the present disclosure provides a method for producing the active material described above, the method comprising: a synthesizing step of synthesizing a first precursor, a washing step of obtaining a second precursor by washing the first precursor with an organic solvent or an acid having specific dielectric constant of 5 or more, and a drying step of obtaining the active material by drying the second precursor by heat.

According to the present disclosure, an active material wherein the volume variation of an electrode layer during charge/discharge may be suppressed, may be obtained by washing the first precursor with an organic solvent or an acid having high specific dielectric constant, and then drying.

In the disclosure, the organic solvent may be a ketone.

In the disclosure, the synthesizing step may include: an alloying treatment of obtaining an alloy compound by alloying a Li based material and an intermediate including at least one of a silicon clathrate II type crystal phase, a silicon clathrate I type crystal phase, and a diamond type Si crystal phase, and a Li removing treatment of removing Li from the alloy compound and forming a void inside a primary particle.

In the disclosure, in the Li removing treatment, the Li may be removed from the alloy compound using an ethanol.

Effects of Disclosure

The present disclosure exhibits effects such that an active material wherein the volume variation of an electrode layer during charge/discharge may be suppressed, may be obtained.

BRIEF DESCRIPTION OF DRAWINGS

FIG. 1A is a schematic perspective view illustrating a silicon clathrate II type crystal phase.

FIG. 1B is a schematic perspective view illustrating a silicon clathrate I type crystal phase Si crystal phase.

FIG. 1C is a schematic perspective view illustrating a diamond type Si crystal phase.

FIG. 2 is a schematic cross-sectional view illustrating an example of an all solid state battery in the present disclosure.

DESCRIPTION OF EMBODIMENTS

Figure 3:
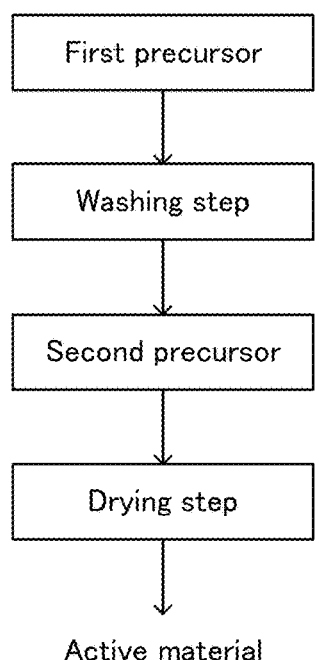
FIG. 3 is a flow chart illustrating an example of the method for producing an active material in the present disclosure.

The active material, the all solid state battery, and the method for producing an active material in the present disclosure are hereinafter described in detail.

A. Active Material

The active material in the present disclosure is an active material used for an all solid state battery, the active material comprising at least Si, and in infrared spectrum, when a maximum peak intensity in 900 cm$^{-1}$ or more and 950 cm$^{-1}$ or less is regarded as $I_1$, and a maximum peak intensity in 1000 cm$^{-1}$ or more and 1100 cm$^{-1}$ or less is regarded as $I_2$, the $I_1$ and the $I_2$ satisfy $0.55 \leq I_2/I_1 \leq 1.0$. The $I_1$ may satisfy $0.01 \leq I_1$. Similarly, the $I_2$ may satisfy $0.01 \leq I_2$.

According to the present disclosure, since the value of $I_2/I_1$ is in a predetermined range, and further, since the value of $I_1$ or $I_2$ is also in a predetermined range, an active material wherein the volume variation of an electrode layer during charge/discharge may be suppressed, may be obtained. As described above, the theoretical capacity of Si is large, which is useful in high energy condensation of a battery. On the other hand, the volume variation of Si is large during charge/discharge. The large volume variation during charge/discharge results in adverse effects such as an energy density decrease due to a durability decrease or an enlargement of the confining jig. Since the large volume variation of the Si particle itself is the biggest problem, the volume variation of an anode layer is often suppressed by limiting the use amount of the Si particle. However, it is difficult to improve the energy density when the use amount of the Si particle is limited.

In view of such circumstances, the present inventors have been studying about providing a void inside the Si particle, and about using a clathrate Si particle, in order to reduce the volume variation of the Si particle. Meanwhile, the present inventors have found out that the agglutination of the Si particle in the electrode layer contributes as a cause of an increase of the volume variation of the electrode layer. Thus, the present inventors have focused on a functional group and a compound existing on the surface or the Si particle, and found out that the agglutination of the Si particle may be suppressed so that the volume variation of the electrode layer may be decreased by controlling the surface condition of the Si particle (specifically, increasing the polarity of the Si particle surface). The reason why the agglutination of the Si particle may be suppressed is presumed as follows; by making the polarity of the surface of Si particles high, the affinity to the solid electrolyte usually exhibiting high polarity is improved so that the Si particles are uniformly dispersed at the time of producing the electrode layer. It is presumed that, since the Si particles are uniformly dispersed so as to increase the contact area between the Si particles and the solid electrolyte, the charge/discharge reaction in the electrode layer is uniformized; as the result, the volume variation of the electrode layer may be suppressed.

The $I_2/I_1$ of the active material in the present disclosure in infrared spectrum (IR spectrum) is in a predetermined range. The $I_1$ is the maximum peak intensity in 900 cm$^{-1}$ or more and 950 cm$^{-1}$ or less, and is usually a peak deriving from Si—R (R is a hydrophobic functional group such as CH$_3$) existing on the surface of the active material. Incidentally, a large peak deriving from CO$_3^{2-}$ may appear in 850 cm$^{-1}$ or more and 880 cm$^{-1}$ or less in some cases. Even if the peak of CO$_3^{2-}$ is shifted to the higher wave number side, the $I_1$ does not correspond to the intensity of the large peak deriving from CO$_3^{2-}$. Also, the $I_1$ may be the intensity of the peak deriving from Si—R in 850 cm$^{-1}$ or more and 950 cm$^{-1}$ or less.

The $I_2$ is the maximum peak intensity in 1000 cm$^{-1}$ or more and 1100 cm$^{-1}$ or less, and is usually a peak deriving from Si—O—Si existing on the surface of the active material. Incidentally, since the peak deriving from Si—O—Si is usually a broad peak, there is a possibility that a clear peak is not confirmed. Taking such case into consideration, the maximum intensity peak in 1000 cm$^{-1}$ or more and 1100 cm$^{-1}$ or less may be treated as the maximum intensity in 1000 cm$^{-1}$ or more and 1100 cm$^{-1}$ or less.

In the present disclosure, the value of $I_2/I_1$ is usually 0.55 or more, may be 0.60 or more, and may be 0.65 or more. Meanwhile, the value of $I_2/I_1$ is usually 1.0 or less, and may be 0.95 or less. Also, the $I_1$ is usually 0.01 or more, may be 0.02 or more, and may be 0.03 or more. Meanwhile, the $I_1$ is, for example, 0.08 or less, and may be 0.06 or less. Also, the $I_2$ is usually 0.01 or more, may be 0.02 or more, and may be 0.03 or more. Meanwhile, the $I_2$ is, for example, 0.08 or less, and may be 0.06 or less. The infrared spectrum (IR spectrum) in the present disclosure is spectrum obtained by ATR method (attenuated total reflection method). Also, the intensity in the IR spectrum denotes an absorbance.

The active material in the present disclosure comprises at least one of a silicon clathrate II type crystal phase, silicon clathrate I type crystal phase, and a diamond type Si crystal phase. Also, the active material comprises any one of the above described crystal phases as a main phase. "Comprising as a main phase" indicates that, among the peaks observed in X-ray diffraction measurement, a peak belonging to the crystal phase is the peak with the strongest diffraction intensity.

The active material in the present disclosure comprises a silicon clathrate II type crystal phase. In the silicon clathrate II type crystal phase, as shown in FIG. 1A, a polyhedron (cage) including a pentagon or a hexagon is formed with a plural of Si elements. This polyhedron has a space within thereof that is capable of including a metal ion such as a Li ion. By a metal ion being intercalated into this space, the volume variation due to charge/discharge may be suppressed. In an all solid state battery, particularly, a high confining pressure is generally needed to be applied in order to suppress the volume variation due to charge/discharge. However, the confining pressure may be reduced by using the active material in the present disclosure; as the result, an enlargement of a confining jig may be suppressed.

The silicon clathrate II type crystal phase usually belongs to the space group (Fd-3m). The silicon clathrate II type crystal phase has a typical peak at a position of $2\theta=20.09°$, $21.00°$, $26.51°$, $31.72°$, $36.26°$, and $53.01°$ in X-ray diffraction measurement using a CuKα ray. These peak positions may vary respectively in a range of $\pm0.50°$, may vary in a range of $\pm0.30°$, and may vary in a range of $\pm0.10°$.

In the silicon clathrate II type crystal phase, a peak at a position of $2\theta=20.09°\pm0.50°$ is regarded as peak "A", and a peak at a position of $2\theta=31.72°\pm0.50°$ is regarded as peak "B". Also, an intensity of the peak "A" is regarded as $I_A$, and an intensity of the peak "B" is regarded as $I_B$. Meanwhile, the maximum intensity in $2\theta=22°$ to $23°$ is regarded as $I_M$. Since a peak of the crystal phase related to Si does not usually appear in the range of $2\theta=22°$ to $23°$, it may be used as a standard.

The value of $I_A/I_M$ is more than 1. When the value of $I_A/I_M$ is 1 or less, it may be determined that the silicon clathrate II type crystal phase is not substantially formed. The value of $I_A/I_M$ is, for example, 2 or more, may be 5 or more, and may be 7 or more. Meanwhile, the upper limit of the value of $I_A/I_M$ is not particularly limited (for example, value of $I_A/I_M$ is 1000 or more in some cases).

The value of $I_B/I_M$ is more than 1. When the value of $I_B/I_M$ is 1 or less, it may be determined that the silicon clathrate II type crystal phase is not substantially formed. The value of $I_B/I_M$ is, for example, 2 or more, and may be 5 or more. Meanwhile, the upper limit of the value of $I_B/I_M$ is not particularly limited (for example, value of $I_B/I_M$ is 1000 or more in some cases).

The active material in the present disclosure may include the silicon clathrate II type crystal phase and may not include the diamond type Si crystal phase described later. "Including no crystal phase" may be confirmed by the peak of that crystal phase not being confirmed in the X-ray diffraction measurement. Also, the active material in the present disclosure may include the silicon clathrate II type crystal phase and may not include the silicon clathrate I type crystal phase described later.

The active material in the present disclosure may comprise a silicon clathrate I type crystal phase. In the silicon clathrate I type crystal phase, as shown in FIG. 1B, since a polyhedron (cage) including a pentagon or a hexagon is formed with a plural of Si elements as similar to the silicon clathrate II type, the volume variation due to charge/discharge may be suppressed.

The silicon clathrate I type crystal phase usually belongs to the space group (Pm-3n). The silicon clathrate I type crystal phase has a typical peak at a position $2\theta=19.44°$, $21.32°$, $30.33°$, $31.60°$, $32.82°$, $36.29°$, $52.39°$, and $55.49°$ in X-ray diffraction measurement using a CuKα ray. These peak positions may be shifted respectively in a range of $\pm0.50°$, may be shifted in a range of $\pm0.30°$, and may be shifted in a range of $\pm0.10°$.

The active material in the present disclosure may comprise a diamond type Si crystal phase. As shown in FIG. 1C, a usual Si includes the diamond type crystal phase. In the diamond type Si crystal phase, a tetrahedron is formed with a plural of Si elements. Since the tetrahedron does not have a space within thereof that is capable of including a metal ion such as a Li ion, the volume variation due to charge/discharge is hardly suppressed. On the other hand, there is an advantage that the manufacturing cost thereof is low, compared to the silicon clathrate.

The diamond type Si crystal phase has a typical peak at a position of $2\theta=28.44°$, $47.31°$, $56.10°$, $69.17°$, and $76.37°$, in an X-ray diffraction measurement using a CuKα ray. These peak positions may be shifted respectively in a range of $\pm0.50°$, may be shifted in a range of $\pm0.30°$, and may be shifted in a range of $\pm0.10°$.

The active material in the present disclosure includes at least Si. The active material includes at least Si, may include Si only, and may further include other element. Examples of the other element may include metal element such as Li, and Na. Incidentally, the elements (such as O, C, and H) included in a functional group or a compound existing on the surface of the active material is excluded. Also, the active material may or may not include SiO skeleton. Also, when the active material includes the silicon clathrate II type crystal phase, for example, the composition thereof is represented by $Na_xSi_{136}$, wherein $0\leq x\leq20$. The "x" may be 0, and may be more than 0. Meanwhile, the "x" may be 10 or less, and may be 5 or less. The composition of the active material may be determined by, for example, EDX, XRD, XRF, ICP, and an atomic absorption spectrometry.

Examples of the shape of the active material in the present disclosure may include a granular shape. The active material may be a primary particle, and may be a secondary particle wherein the primary particles are agglutinated. The average particle size of the primary particle is, for example, 50 nm or more, may be 100 nm or more, and may be 150 nm or more. Meanwhile, the average particle size of the primary particle is, for example, 3000 nm or less, may be 1500 nm or less, and may be 1000 nm or less. Also, the average particle size of the secondary particle is, for example, 1 μm or more, may be 2 μm or more, and may be 5 μm or more. Meanwhile, the average particle size of the secondary particle is, for example, 60 μm or less, and may be 40 μm or less. Incidentally, the average particle size may be determined by observation with a SEM, for example. The number of the sample is large; for example, 20 or more, may be 50 or more, and may be 100 or more.

The active material in the present disclosure includes a void inside a primary particle. The reason therefor is to further suppress the volume variation during charge/discharge. Particularly, the active material includes many minute voids with a fine pore diameter of 100 nm or less. The reason therefor, is to suppress the collapsing of the voids by pressing. The void amount of the void with a fine pore diameter of 100 nm or less is, for example, 0.05 cc/g or more, may be 0.07 cc/g or more, and may be 0.10 cc/g or more. Meanwhile, the void amount is, for example, 0.15 cc/g or less. The void amount may be determined by, for example, a mercury porosimeter measurement, a BET measurement, a gaseous adsorption method, 3D-SEM, and 3D-TEM.

When the active material in the present disclosure includes a void inside a primary particle, the void ratio is, for example, 4% or more, and may be 10% or more. Also, the void ratio is, for example, 40% or less, and may be 20% or less. The void ratio may be determined by, for example, the following procedure. First, a cross-section of an electrode layer including an active material is obtained by carrying out an ion milling process thereto. Then, the cross-section is observed with a SEM (scanning electron microscope), and a photograph of the particle is taken. In the obtained photograph, the silicon part and the void part are rigidly distinguished and digitalize with an image analyzing software. The areas of the silicon part and the void part are determined, and the void ratio (%) is calculated from the below described formula.

$$\text{Void ratio}\,(\%) =$$
$$100 \times (\text{void part area}) / ((\text{silicon part area}) + (\text{void part area}))$$

The specific image analyzing and the calculation of the void ratio may be carried out as described below. As the image analyzing software, for example, Fiji ImageJ bundled with Java 1.8.0_172 (hereinafter, Fiji) is used. The image is colorized into an RGB color image by combining a secondary electron image and a reflection electron image in the same field of view. Then, in order to eliminate the noise of each pixel, the obtained RGB image is blurred with the function of Fiji "Median (filter size=2)". Next, with the function of Fiji "Weka Machine Learning", a plurality of arbitrary regions in the noise eliminated image are specified into the silicon part or the void part respectively by a person, and teaching data wherein the silicon part and the void part are rigidly distinguished are formed. Then, based on the formed teaching data, the silicon part and the void part are discriminated with a machine in Fiji, and the area ratio of the silicon part and the void part is calculated.

In relation to the colorizing into the RGB color image, since both of the secondary electron image and the reflection electron image are displayed in a grayscale, the brightness "x" of each pixel in the secondary electron image is assigned to Red value, and the brightness "y" in the reflection electron image is similarly assigned to Green value, for example. Thereby, each pixel are colorized into an RGB color image as, for example, R=x, G=y, B=(x+y)/2.

The detailed conditions in "Weka Machine Learning" described above will be hereinafter described. As training features (numerical features of an image to be focused by a machine when forming teaching data in a machine learning), Gaussian blur, Hessian, Membrane projections, Mean, Maximum, Anisotropic diffusion, Sobel filter, Difference of gaussians, Variance, Minimum, Median are selected. Also, for other parameters, Membrane thickness is set to 3, Membrane patch size is set to 19, Minimum sigma is set to 1.0, and Maximum sigma is set to 16.0.

The active material in the present disclosure is usually used for an all solid state battery. The active material in the present disclosure may be an anode active material, may be a cathode active material. In the present disclosure, an electrode layer (anode layer or cathode layer) including the above described active material, and an all solid state battery including the electrode layer may be provided. Examples of the method for producing an active material may include the method for producing described in "C. Method for producing active material" described later.

B. All Solid State Battery

FIG. 2 is a schematic cross-sectional view illustrating an example of the all solid state battery in the present disclosure. All solid state battery 10 shown in FIG. 2 comprises cathode layer 1, anode layer 2, solid electrolyte layer 3 formed between cathode layer 1 and anode layer 2, cathode current collector 4 for collecting currents of cathode layer 1, and anode current collector 5 for collecting currents of anode layer 2. In the present disclosure, anode layer 2 includes the active material described above, and a solid electrolyte.

According to the present disclosure, an all solid state battery wherein the volume variation of an anode layer during charge/discharge may be suppressed, may be obtained by using the above described active material.

1. Anode Layer

The anode layer is a layer including at least an anode active material and a solid electrolyte. Also, the anode layer may include at least one of a conductive material, and a binder as required.

The anode active material may be in the same contents as those described in "A. Active material" above; thus, the description herein is omitted. The ratio of the anode active material in the anode layer is, for example, 20 weight % or more, may be 30 weight % or more, and may be 40 weight % or more. When the ratio of the anode active material is too low, a sufficient energy density may not be obtained. Meanwhile, the ratio of the anode active material is, for example, 80 weight % or less, may be 70 weight % or less, and may be 60 weight % or less. When the ratio of the anode active material is too high, an ion conductivity and an electron conductivity in the anode layer may be reduced, relatively.

The anode layer may include at least one of a solid electrolyte, a conductive material, and a binder as required. Examples of the solid electrolyte may include the solid electrolyte which will be described in "3. Solid electrolyte layer" later. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber-based binders and fluorine-based binders.

The thickness of the anode layer is, for example, 0.1 μm or more and 1000 μm or less. The anode layer in the present disclosure is usually used for an all solid state battery.

2. Cathode Layer

The cathode layer is a layer including at least a cathode active material. Also, the cathode layer may include at least one of a solid electrolyte, a conductive material, and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

A coating layer including a Li ion conductive oxide may be formed on the surface of the oxide active material. The reason therefor is to suppress the reaction of the oxide active material with the solid electrolyte (particularly sulfide solid electrolyte). Examples of the Li ion conductive oxide may include $LiNbO_3$. The thickness of the coating layer is, for example, 1 nm or more and 30 nm or less. Also, $Li_2S$ may be used, for example, as the cathode active material.

The solid electrolyte, the conductive material and the binder used for the cathode layer may be in the same contents as those described in "1. Anode layer" above; thus, the description herein is omitted. The thickness of the cathode layer is, for example, 0.1 μm or more and 1000 μm or less.

3. Solid Electrolyte Layer

The solid electrolyte layer is a layer formed between the cathode layer and the anode layer, and includes at least a solid electrolyte.

Examples of the solid electrolyte may include inorganic solid electrolytes such as sulfide solid electrolyte, oxide solid electrolyte, nitride solid electrolyte, and halide solid electrolyte. Examples of the sulfide solid electrolyte may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element. The sulfide solid electrolyte may be a glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

The thickness of the solid electrolyte layer is, for example, 0.1 μm or more and 1000 μm or less.

4. Other Constitutions

The all solid state battery in the present disclosure comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

The all solid state battery in the present disclosure may further include a confining jig that applies a confining pressure along the thickness direction, to the cathode layer, the solid electrolyte layer and the anode layer. By using the confining jig, a favorable ion conductive path and an electron conductive path may be formed. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. All Solid State Battery

The kind of the all solid state battery in the present disclosure is not particularly limited; and typically a lithium ion battery. Also, the all solid state battery in the present disclosure may be a primary battery and may be a secondary battery; above all, the secondary battery so as to be repeatedly charged and discharged, and be useful as a car-mounted battery, for example.

The all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the all solid state battery may include a coin shape, a laminate shape, a cylindrical shape, and a square shape.

C. Method for Producing Active Material

Figure 4:
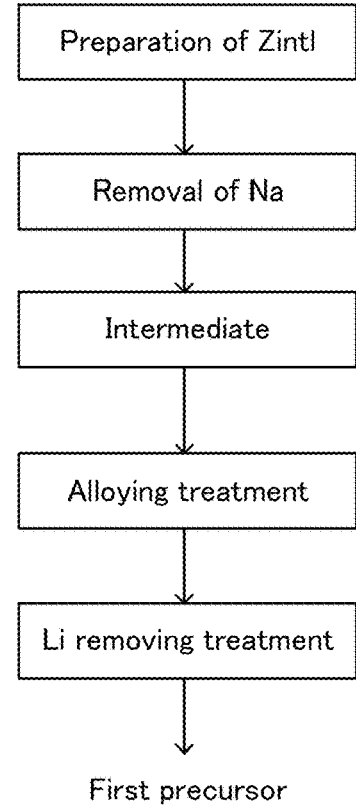
FIG. 4 is a flow chart illustrating an example of the method for synthesizing a first precursor in the present disclosure.

FIG. 3 is a flow chart illustrating an example of the method for producing an active material in the present disclosure. In the method for producing shown in FIG. 3, a first precursor is synthesized at first. Then, the first precursor is washed with an organic solvent or an acid having specific dielectric constant of 5 or more, to obtain a second precursor. Then, the second precursor is dried by heat, to obtain a desired active material. FIG. 4 is a flow chart illustrating an example of the method for synthesizing the first precursor in the present disclosure. In FIG. 4, a Zintl compound including Na and Si, and including at least a Zintl phase is prepared, and an intermediate including a silicon clathrate II type crystal phase is obtained by removing Na from the Zintl compound. Then, an alloy compound is obtained by alloying the intermediate and a Li based material at a predetermined ratio (alloying treatment). Then, a void is formed inside a primary particle by removing the Li from the alloy compound (Li removing treatment). Thereby, a first precursor including a silicon clathrate II type crystal phase may be obtained.

According to the present disclosure, an active material wherein the volume variation of an electrode layer during charge/discharge may be suppressed, may be obtained by washing the first precursor with an organic solvent or an acid having high specific dielectric constant, and then drying. It is presumed that, when $C_2H_5OH$ (a compound including OH group), $CH_3COONa$, or $CH_3COOLi$, for example exists on the surface of the active material, Si—R (R is a hydrophobic functional group such as $CH_3$) is formed on the surface of the active material in the drying step thereafter, so that the polarity of the surface of the active material is decreased. The $I_1$ increases when Si—R exists in a large number. In contrast to this, in the present disclosure, by treating the surface of the active material with an organic solvent or an acid having high specific dielectric constant, $C_2H_5OH$, for example, may be removed. Therefore, the ratio of Si—R may be decreased even the drying step is carried out. As the result, the ratio of Si—O—Si having high polarity may be increased so that the agglutination of the active material during the production of the electrode layer may be suppressed.

1. Synthesizing Step

The synthesizing step in the present disclosure is a step of synthesizing a first precursor. The first precursor corresponds to an active material prior to the washing step. The first precursor includes at least Si, may include Si only, and may further include other element. The other element is similar to those described in the section of "A. Active material" above. Also, the first precursor includes at least one of a silicon clathrate II type crystal phase, a silicon clathrate I type crystal phase, and a diamond type Si crystal phase. Also, the first precursor includes any one of the above described crystal phase as a main phase.

The method for synthesizing the first precursor is not particularly limited, and the method may be, for example, a method including an alloying treatment of obtaining an alloy compound by alloying a Li based material and an intermediate including at least one of a silicon clathrate II type crystal phase, a silicon clathrate I type crystal phase, and a diamond type Si crystal phase; and a Li removing treatment of removing Li from the alloy compound and forming a void inside a primary particle.

(1) Intermediate

The intermediate includes at least one of a silicon clathrate II type crystal phase, a silicon clathrate I type crystal phase, and a diamond type Si crystal phase. Also the first precursor includes any one of the above described crystal phase as a main phase. As an intermediate including the diamond type Si crystal phase, for example, commercially available Si particles may be used. Meanwhile, an intermediate including the silicon clathrate II type crystal phase or the silicon clathrate I type crystal phase may be obtained by, for example, a method wherein Na is removed from a Zintl compound including Na and Si, and also including at least a Zintl phase. By adjusting the Na removing conditions, the ratio of the silicon clathrate II type crystal phase and the silicon clathrate I type crystal phase may be adjusted. A method for preparing an intermediate including the silicon clathrate II type crystal phase or the silicon clathrate I type crystal phase will be hereinafter described.

(i) Preparation of Zintl

The Zintl compound includes a Zintl phase. The Zintl phase has a typical peak at a position of $2\theta = 16.10°$, $16.56°$, $17.64°$, $20.16°$, $27.96°$, $33.60°$, $35.68°$, $40.22°$, and $41.14°$ in X-ray diffraction measurement using a CuKα ray. These peak positions may vary respectively in a range of $\pm 0.50°$, and may vary in a range of $\pm 0.30°$. The Zintl compound includes the Zintl phase as a main phase. The Zintl compound may or may not include a silicon clathrate I type crystal phase. Also, the Zintl compound may or may not include a silicon clathrate II type crystal phase.

The composition of the Zintl compound is not particularly limited, and is a composition represented by $Na_zSi_{136}$, wherein $121 \le z \le 151$. The "z" may be 126 or more, and may be 131 or more. Meanwhile, the "z" may be 141 or less.

The Zintl compound may be obtained by, for example, carrying out a heat treatment to a raw material mixture including Na (simple substance) and Si (simple substance). The ratio of Na (simple substance) and Si (simple substance) is not particularly limited; to 1 mol part of Si (simple substance), Na (simple substance) is, for example, 0.8 mol parts or more, and may be 1 mol part or more. Meanwhile, to 1 mol part of Si (simple substance), Na (simple substance) is, for example, 1.5 mol parts or less, and may be 1.3 mol parts or less.

The heat treatment temperature is, for example, 500° C. or more and 1000° C. or less. Also, the heat treating time is, for example, 1 hour or more and 50 hours or less. Particularly, the heat treatment is carried out under the conditions of approximately 700° C. (such as 650° C. or more and 750° C. or less) and approximately 20 hours (such as 15 hours or more and 25 hours or less).

(ii) Removal of Na

Examples of the method for removing Na from the Zintl compound may include a heat treatment. The heat treatment temperature is, for example, 280° C. or more, and may be 300° C. or more. Meanwhile, the heat treatment temperature is, for example, 500° C. or less. The heat treating time is, for example, 1 hour or more and 50 hours or less. The heat treatment may be carried out under ambient pressure atmosphere, and may be carried out under reduced pressure atmosphere. In the latter case, the pressure at the time of heat treatment is, for example, 10 Pa or less, may be 1 Pa or less, and may be 0.1 Pa or less. Also, the heat treatment may be carried out under inert gas atmosphere such as an Ar atmosphere.

(iii) Intermediate

The composition of the intermediate obtained by the above described method is not particularly limited, and is a composition represented by $Na_ySi_{136}$, wherein $0 \le y \le 24$. The "y" may be 0, and may be more than 0. Meanwhile, the "y" may be 20 or less, and may be 10 or less.

(2) Alloying Treatment

The alloying treatment in the present disclosure is a treatment of obtaining an alloy compound by alloying a Li based material and the intermediate.

The Li based material is not particularly limited as long as it capable of being alloyed with the intermediate; it may be a simple substance of Li, and may be a Li alloy. The Li alloy is an alloy including Li as a main component so as to be easily alloyed with the intermediate. Examples of the method for alloying the intermediate and the Li based material may include a method wherein the two are mixed, and a method wherein the two are heat treated.

In the alloying step, the alloying of the intermediate and the Li based material is carried out so as the molar ratio (Li/Si) of Li included in the Li based material to Si included in the intermediate is in a predetermined range. The Li/Si is, for example, 0.5 or more, may be 0.75 or more, and may be 1 or more. When the Li/Si is too low, the void may not be formed inside the primary particle. Meanwhile, the Li/Si is, for example, 3 or less, may be 2.5 or less, and may be 2 or less. When the Li/Si is too high, a desired crystal phase may not be maintained. Since the crystallinity of Si tends to decrease by alloying with Li, the Li/Si is controlled.

(3) Li Removing Treatment

The Li removing treatment in the present disclosure is a treatment of removing the Li from the alloy compound and forming a void inside a primary particle. By removing the Li included in the alloy compound (highly dispersed Li), a nano sized (nano order) void may be formed.

Examples of the method for removing Li from the alloy compound may include a method wherein the alloy compound is reacted with a Li extracting material. Examples of the Li extracting material may include a liquid. Examples of the Li extracting material may include primary alcohols such as methanol, ethanol, 1-propanol, 1-butanol, 1-pentanol, and 1-hexanol; secondary alcohols such as 2-propanol, 2-butanol, 2-pentanol, and 2-hexanol; tertiary alcohols such as tert-butyl alcohol; phenolics such as phenol; glycols such as 1,2-ethanediol and 1,3-butanediol; glycol ethers such as propylene glycol monomethyl ether and ethylene glycol monomethyl ether; pyranoses such as b-D-glucopyranose; furanoses such as erythrofuranose; glucoses; fructoses; and polysaccharides. The Li extracting material is at least one kind of methanol, ethanol, 1-propanol, 2-propanol, 1-butanol, and 1-hexanol. Particularly, the Li extracting material includes at least ethanol. Also, as the Li extracting material, for example, acids such as acetic acid, formic acid, propionic acid, and oxalic acid may be used. In the present disclosure, two kinds or more of the Li extracting material may be used. In this case, the two kinds or more of the Li extracting material may be used as a mixture, and may be used separately (treatments of two steps or more may be carried out as the Li removal).

The water content of the Li extracting material is low. When the water content is too high, the alloy compound may be deteriorated. The water content in the Li extracting material is, for example, 100 ppm or less, and may be 10 ppm or less. The weight ratio of the Li extracting material to the alloy compound is, for example, 5 or more, may be 10 or more, and may be 15 or more. Meanwhile, the weight ratio is, for example, 500 or less, and may be 250 or less.

The method for reacting the alloy compound with the Li extracting material is not particularly limited. The alloy compound may be brought into direct contact with the Li extracting material, and a dispersion wherein the alloy compound is dispersed may be brought into contact with the Li extracting material. Examples of a dispersing medium may include saturated hydrocarbons such as n-heptane, n-octane, n-decane, 2-ethylhexane, and cyclohexane; unsaturated hydrocarbons such as hexene and heptene; aromatic hydrocarbons such as 1,3,5-trimethylbenzene, toluene, xylene, ethylbenzene, propylbenzene, cumene, 1,2,4-trimethylbenzene, and 1,2,3-trimethylbenzene; and ethers such as n-butylether, n-hexylether, isoamyl ether, diphenylether, methylphenyl ether, and cyclopentylmethyl ether. The specific dielectric constant of the dispersing medium is, for example, 3.08 or less, and may be 3.00 or less. Meanwhile, the specific dielectric constant of the dispersing medium is, for example, 1.50 or more, and may be 1.70 or more. The specific dielectric constant may be measured by, for example, a method described in JIS C 2565 (such as cavity resonator method).

2. Washing Step

The washing step in the present disclosure is a step of obtaining a second precursor by washing the first precursor with an organic solvent or an acid having specific dielectric constant of 5 or more. The second precursor corresponds to an active material after the washing step and prior to the drying step. Also, the second precursor and the first precursor usually include the same crystal phase.

The specific dielectric constant ($25°$ C.) of the organic solvent or the acid is usually 5 or more, may be 10 or more, and may be 15 or more. Examples of the organic solvent may include ketones such as acetone, methyl ethyl ketone, and diethyl ketone; alcohols such as ethanol, methanol, and propanol; esters such as methyl acetate, ethyl acetate, butyl acetate, and butyl butyrate; and ethers such as diethyl ether and dibutyl ether. Also, an aromatic hydrocarbon may be used as an organic solvent. Meanwhile, examples of the acid may include an inorganic acid such as hydrochloric acid, sulfuric acid, and nitric acid.

Examples of the method for washing the first precursor with the organic solvent may include a method wherein the first precursor is immersed into the organic solvent. In this case, an ultrasonic treatment may be carried out. Also, the first precursor may be washed by spraying the organic solvent thereto. The washing time is not particularly limited, and it may be, for example, 10 minutes or more and 10 hours or less. In the infrared spectrum, the second precursor may have a peak deriving from —OH in 2800 $cm^{-1}$ or more and 3500 $cm^{-1}$ or less.

3. Drying Step

The drying step in the present disclosure is a step of obtaining the active material by drying the second precursor by heat. The drying step is a step of removing the organic solvent or the acid from the second precursor. Also, when the second precursor incudes Na, for example, Na may or may not be removed from the second precursor in the drying step.

The drying temperature is, for example, $280°$ C. or more, and may be $300°$ C. or more. Meanwhile, the drying temperature is, for example, $500°$ C. or less. The drying time is, for example, 1 hour or more and 50 hours or less. The drying may be carried out under ambient pressure atmosphere, and may be carried out under reduced pressure atmosphere. In the latter case, the pressure at the time of the drying is, for example, 10 Pa or less, may be 1 Pa or less, and may be 0.1 Pa or less. Also, the drying may be carried out under inert gas atmosphere such as an Ar atmosphere. Also, examples of the method for drying may include a method wherein a combustion furnace is used.

4. Active Material

The active material obtained by the above described steps may be in the same contents as those described in "A. Active material" above; thus, the description herein is omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Synthesis of Active Material>

Si particles and Na particles were mixed so as to be 1:1 in the molar ratio, projected into a melting pot, the pot was sealed under an Ar atmosphere, and heated at $700°$ C. so as to synthesize NaSi (Zintl compound). Then, under vacuum (approximately 1 Pa), Na was removed by heating at $340°$ C. so as to obtain an intermediate. The obtained intermediate and metal Li were weighed so as Li/Si=1 in molar ratio, and mixed in a mortar under an Ar atmosphere so as to obtain an alloy compound. By reacting the obtained alloy compound with ethanol under an Ar atmosphere, a void was formed inside a primary particle so as to obtain a first precursor. Incidentally, the weight ratio of the alloy compound and the ethanol was alloy compound:ethanol=12:400.

Next, the obtained first precursor was washed.

Specifically, the first precursor was immersed into acetone, an ultrasonic treatment was carried out for 30 minutes using an ultrasonic device (US-3KS from SND Co., Ltd.), and a second precursor was obtained. Then, an active material was obtained by drying the second precursor under the conditions of $430°$ C. for 6 hours using a combustion furnace.

<Production of Anode>

The obtained active material, a sulfide solid electrolyte ($Li_2S$—$P_2S_5$ based glass ceramic) a conductive material (VGCF), a butyl butyrate solution containing a PVDF-based binder at the ratio of 5 weight %, and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on an anode current collector (a Cu foil, from UACJ Corp.) by a blade method using an applicator, dried for 30 minutes on a hot plate at $100°$ C. An anode including an anode current collector and an anode layer was obtained in the above manner.

<Production of Cathode>

A cathode active material ($LiNi_{1/3}Co_{1/3}Mn_{1/3}O_2$, average particle size of 6 µm), a sulfide solid electrolyte ($Li_2S$—$P_2S_5$ based glass ceramic), a conductive material (VGCF), a butyl butyrate solution containing a PVDF-based binder at the ratio of 5 weight %, and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 3 minutes. The obtained mixture was pasted on a cathode current collector (an Al foil, from Showa Denko Co., Ltd.) by a blade method using an applicator, dried for 30 minutes on a hot plate at 100° C. A cathode including a cathode current collector and a cathode layer was obtained in the above manner. Incidentally, the area of the cathode was made smaller than the area of the anode.

<Production of Solid Electrolyte Layer>

A sulfide solid electrolyte ($Li_2S$—$P_2S_5$ based glass ceramic), a heptane solution containing a butylene rubber based binder at the ratio of 5 weight %, and a heptane were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on a release sheet (an Al foil) by a blade method using an applicator, dried for 30 minutes on a hot plate at 100° C. A transfer member including the release sheet and a solid electrolyte layer was obtained in the above manner.

<Production of all Solid State Battery>

A solid electrolyte layer for joining was placed on the cathode layer of the cathode, set in a roll press machine, and pressed under 20 kN/cm (approximately 710 MPa) at 165° C. Thereby, a first stacked body was obtained.

Next, the anode was set in a roll press machine, and pressed under 20 kN/cm (approximately 630 MPa) at 25° C. Then, the solid electrolyte layer for joining and the transfer member were placed in this order from the anode layer side. On this occasion, the solid electrolyte layer for joining and the solid electrolyte layer of the transfer member were placed so as to face to each other. The obtained stacked body was set in planner uniaxial press machine, temporary pressed for 10 seconds under 100 MPa at 25° C. Then, the release sheet was peeled off from the solid electrolyte layer. Thereby, a second stacked body was obtained.

Next, the solid electrolyte layer for joining of the first stacked body and the solid electrolyte layer of the second stacked body were placed so as to face to each other, set in planner uniaxial press machine, pressed for 1 minute under 200 MPa at 135° C. Thereby, an all solid state battery was obtained.

Example 2

An active material was obtained in the same manner as in Example 1 except that the weight ratio of the alloy compound and the ethanol was changed to alloy compound: ethanol=1:150. An all solid state battery was obtained in the same manner as in Example 1, using the obtained active material.

Comparative Examples 1 and 2

An active material was obtained in the same manner as in Examples 1 and 2 except that the first precursor was not washed. An all solid state battery was obtained in the same manner as in Example 1, using the obtained active material.

Comparative Example 3

An all solid state battery was obtained in the same manner as in Example 1 except that a commercially available Si particles (diamond type Si particles) were used.

Evaluation

<Ir Measurement>

An infrared spectrum (IR) measurement was carried out for the active materials obtained in Examples 1 to 2 and Comparative Examples 1 to 3. The IR measurement was carried out according to a single reflection ART method (ATR accessory: Thunderdome from SpectraTech Inc.), with DTGS detector, under the conditions of wave number resolution of 4 $cm^{-1}$, cumulated number of 128. The results are shown in Table 1 and FIG. 5.

<Confining Pressure Increase Measurement>

The confining pressure increase was measured by charging the all solid state batteries obtained in Examples 1 to 2 and Comparative Examples 1 to 3. The test conditions were the confining pressure (constant size) of 5 MPa, charging at 0.1 C, and cutoff voltage of 4.55 V. The confining pressure at 4.55 V was measured, and the confining pressure increase from the state before the charge was determined. The results are shown in Table 1. Incidentally, the results of the confining pressure increase in Table 1 are relative values when the result in Comparative Example 1 is regarded as 100.

<XRD Measurement>

An X-ray diffraction (XRD) measurement using a CuKα ray was carried out to the active materials obtained in Examples 1 to 2 and Comparative Examples 1 to 2. As the result, it was confirmed that the active materials obtained in Examples 1 to 2 and Comparative Examples 1 to 2 include the silicon clathrate II type crystal phase as a main phase, among the crystal phases.

Also, in the silicon clathrate II type crystal phase, the intensity of the peak "A" located at a position in the vicinity of 2θ=20.090 was regarded as $I_A$, the intensity of the peak "B" located at a position in the vicinity of 2θ=31.72° was regarded as $I_B$. Also, the maximum intensity in 2θ=220 to 230 was regarded as $I_M$, and $I_A/I_M$ and $I_B/I_M$ were determined. The results are shown in Table 1.

<Void Amount Measurement>

The void amount (void amount of the void with a fine pore diameter of 100 nm or less) of the active materials obtained in Examples 1 to 2 and Comparative Examples 1 to 2 was determined. A mercury porosimeter was used for the measurement of the void amount. Pore Master 60-GT (from Quanta Chrome Co.) was used as a measuring device, and the measurement was carried out in a range of 40 Å to 4,000,000 Å. Washburn method was used for analysis. The results are shown in Table 1.

<SEM Measurement>

A SEM-EDX (scanning electron microscope-energy dispersion type X-ray spectroscope) measurement was carried out for the active materials obtained in Examples 1 to 2 and Comparative Examples 1 to 2. As the result, it was confirmed that a nano-sized void was formed inside the primary particle in the active materials obtained in Examples 1 to 2 and Comparative Examples 1 to 2.

TABLE 1

| | $I_1$ | $I_2$ | $I_2/I_1$ | Confining pressure increase (%) | $I_A/I_M$ | $I_B/I_M$ | Void amount (cc/g) |
|---|---|---|---|---|---|---|---|
| Comp. Ex. 1 | 0.083 | 0.044 | 0.536 | 100 | 1.22 | 1.16 | 0.113 |
| Comp. Ex. 2 | 0.118 | 0.060 | 0.506 | 83 | 1.31 | 1.15 | 0.123 |
| Comp. Ex. 3 | 0.005 | 0.004 | 0.747 | 146 | 1.08 | 0.66 | 0.021 |

TABLE 1-continued

| | $I_1$ | $I_2$ | $I_2/I_1$ | Confining pressure increase (%) | $I_A/I_M$ | $I_B/I_M$ | Void amount (cc/g) |
|---|---|---|---|---|---|---|---|
| Example 1 | 0.057 | 0.041 | 0.727 | 38 | 1.20 | 1.09 | 0.121 |
| Example 2 | 0.044 | 0.041 | 0.931 | 25 | 1.24 | 1.17 | 0.120 |

Figure 5:
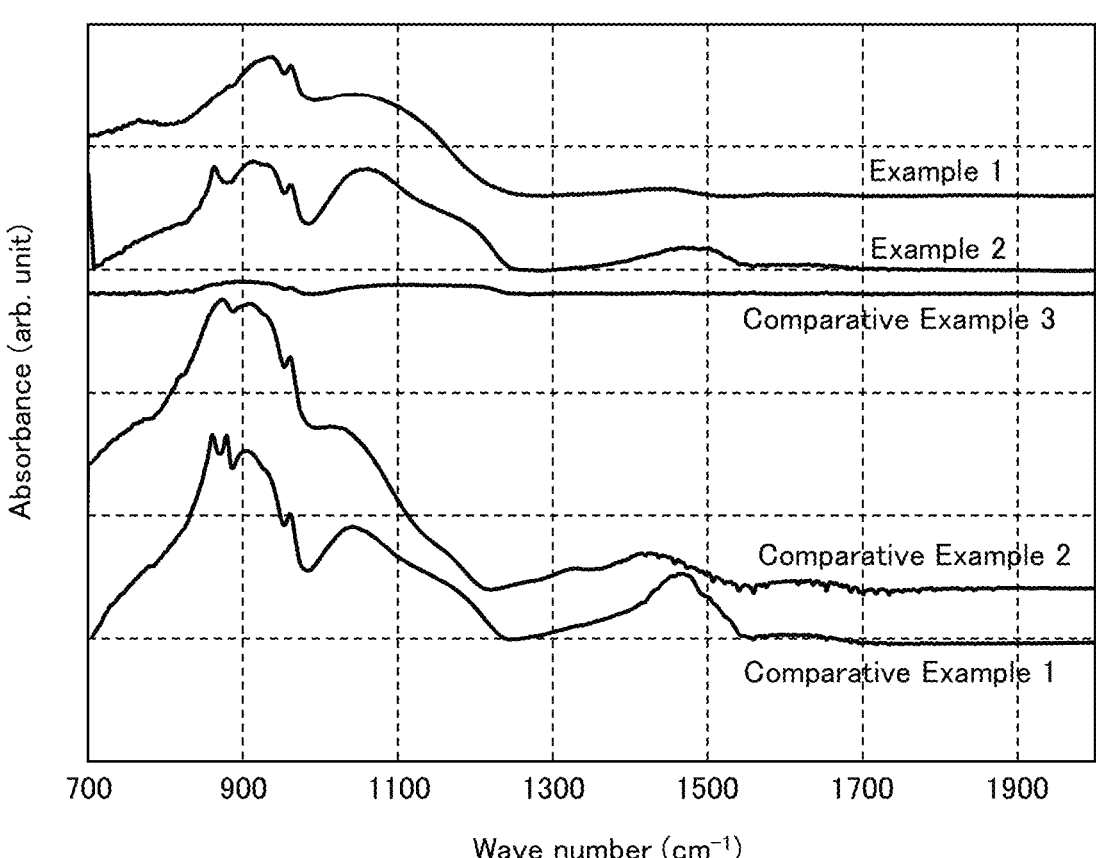
FIG. 5 is the result of an IR measurement for the active materials obtained in Examples 1 to 2 and Comparative Examples 1 to 3.

As shown in Table 1 and FIG. 5, compared to Comparative Examples 1 to 2, it was confirmed that the value of $I_2/I_1$ was high, and the confining pressure increase was remarkably low in Examples 1 to 2. Specifically, in Examples 1 to 2, the confining pressure increase was reduced by 70% or more, compared to Comparative Example 1. The reason therefor is presumed that since the polarity of the surface of Si particles was high, the affinity to the solid electrolyte usually exhibiting high polarity was improved so that the Si particles were uniformly dispersed at the time of producing the anode layer. Also, it is presumed that, since the Si particles were uniformly dispersed so as to increase the contact area between the Si particles and the solid electrolyte, the charge/discharge reaction in the anode layer was uniformized; as the result, the volume variation of the anode may be suppressed. Meanwhile, in Comparative Example 3, although the value of $I_2/I_1$ was high, the value of $I_2$ and $I_1$ were low, and the confining pressure increase was also high.

Also, in Examples 1 to 2 and Comparative Examples 1 to 2, both of the value of $I_A/I_M$ and the value of $I_B/I_M$ were higher than 1, and it was confirmed that the silicon clathrate II type crystal phase was formed. Meanwhile, in Comparative Example 3, the value of $I_B/I_M$ was 1 or less, and the silicon clathrate II type crystal phase was not formed.

REFERENCE SIGNS LIST

1 . . . cathode layer
2 . . . anode layer
3 . . . solid electrolyte layer
4 . . . cathode current collector
5 . . . anode current collector
10 . . . all solid state battery

What is claimed is:

1. An active material for an all solid state battery, the active material comprising at least Si, and in an infrared spectrum, when a maximum peak intensity in 900 cm$^{-1}$ or more and 950 cm$^{-1}$ or less is regarded as $I_1$, and a maximum peak intensity in 1000 cm$^{-1}$ or more and 1100 cm$^{-1}$ or less is regarded as $I_2$, the $I_1$ and the $I_2$ satisfy $0.55 \leq I_2/I_1 \leq 1.0$;

wherein:

the active material comprises at least one of a silicon clathrate II type crystal phase or a silicon clathrate I type crystal phase;

the active material includes a void inside a primary particle; and a void amount of the void with a fine pore diameter of 100 nm or less is 0.05 cc/g or more and 0.15 cc/g or less.

2. An all solid state battery comprising a cathode layer, an anode layer, and a solid electrolyte layer formed between the cathode layer and the anode layer, and the anode layer includes the active material according to claim 1, and a solid electrolyte.

3. The active material according to claim 1, wherein a void ratio is 4% or more and 40% or less.

4. The active material according to claim 1, wherein the $I_1$ and the $I_2$ satisfy $0.727 \leq I_2/I_1 \leq 0.931$.

5. The active material according to claim 1, wherein the void is observable with a scanning electron microscope.

6. A method for producing an active material for an all solid state battery, the active material comprising at least Si, in an infrared spectrum, when a maximum peak intensity in 900 cm$^{-1}$ or more and 950 cm$^{-1}$ or less is regarded as $I_1$, and a maximum peak intensity in 1000 cm$^{-1}$ or more and 1100 cm$^{-1}$ or less is regarded as $I_2$, the $I_1$ and the $I_2$ satisfy $0.55 \leq I_2/I_1 \leq 1.0$, the active material comprises at least one of a silicon clathrate II type crystal phase or a silicon clathrate I type crystal phase, the active material includes a void inside a primary particle, a void amount of the void with a fine pore diameter of 100 nm or less is 0.05 cc/g or more and 0.15 cc/g or less, the method comprising:

a synthesizing step of synthesizing a first precursor, a washing step of obtaining a second precursor by washing the first precursor with an organic solvent or an acid having specific dielectric constant of 5 or more, and a drying step of obtaining the active material by drying the second precursor by heat.

7. The method for producing an active material according to claim 6, wherein the organic solvent is a ketone.

8. The method for producing an active material according to claim 6, wherein the synthesizing step includes:

an alloying treatment of obtaining an alloy compound by alloying a Li based material and an intermediate including at least one of a silicon clathrate II type crystal phase, a silicon clathrate I type crystal phase, or a diamond type Si crystal phase, and a Li removing treatment of removing Li from the alloy compound and forming a void inside a primary particle.

9. The method for producing an active material according to claim 8, wherein, in the Li removing treatment, the Li is removed from the alloy compound using an ethanol.

* * * * *